Figure 1:
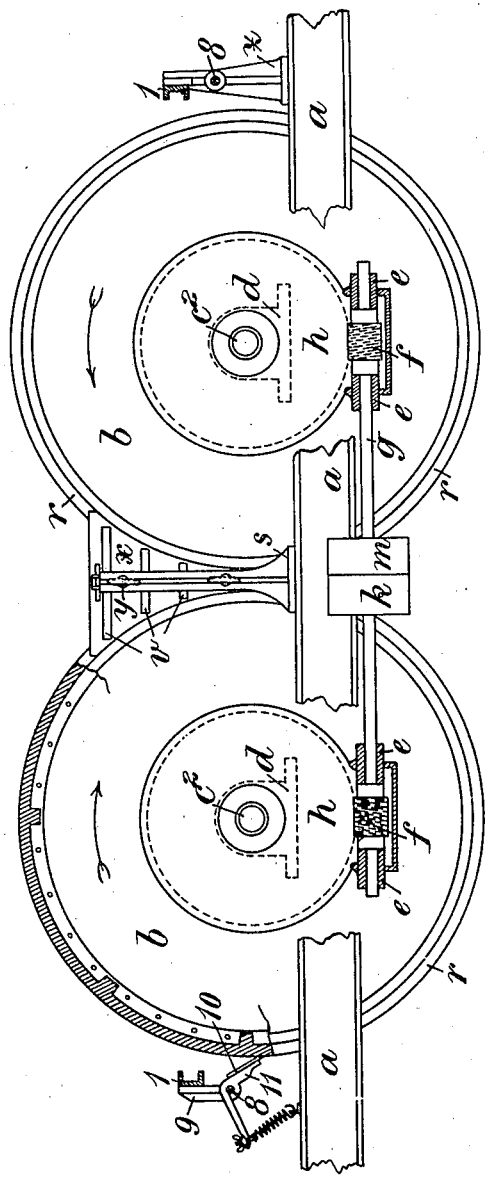

H. H. & E. SCHOU.
PROCESS OF MANUFACTURING BUTTERIN.
APPLICATION FILED FEB. 15, 1907.

904,231.

Patented Nov. 17, 1908.

4 SHEETS—SHEET 1.

Witnesses:
Inventors:
Hans H. and Ejnar Schou
by Rosenbaum & Stockbridge
Attys.

H. H. & E. SCHOU.
PROCESS OF MANUFACTURING BUTTERIN.
APPLICATION FILED FEB. 15, 1907.
904,231.
Patented Nov. 17, 1908.
4 SHEETS—SHEET 2.
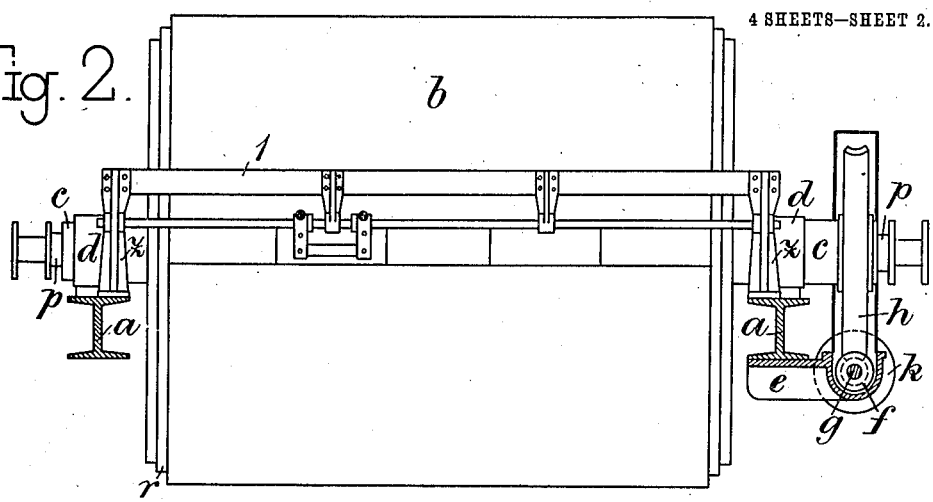
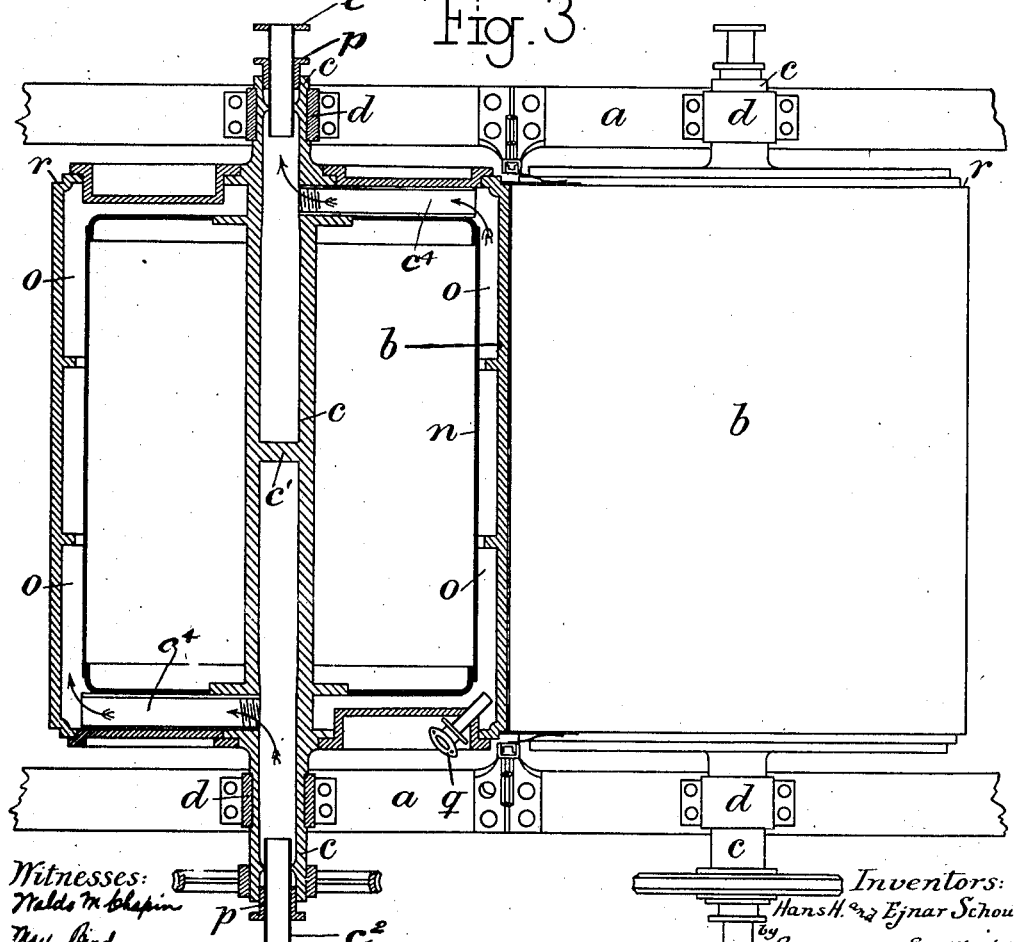

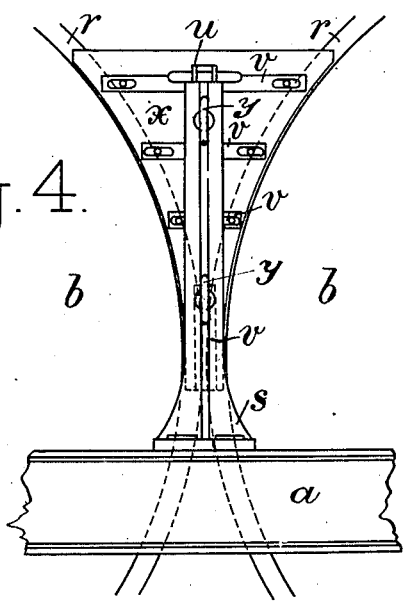
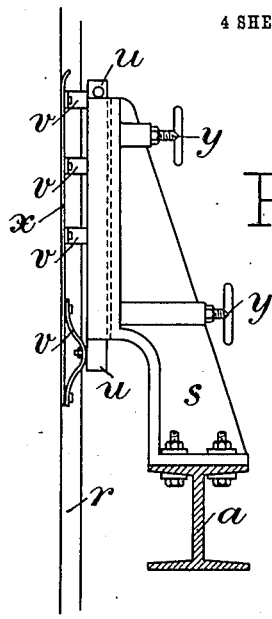
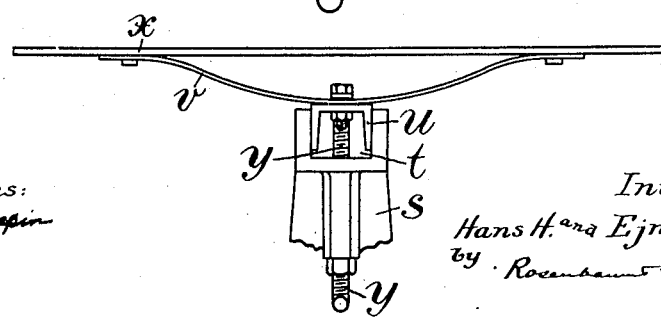
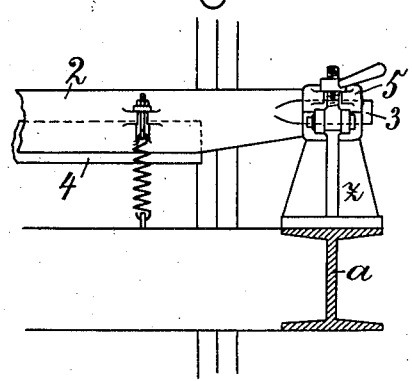
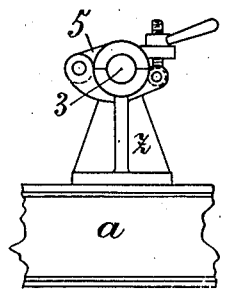
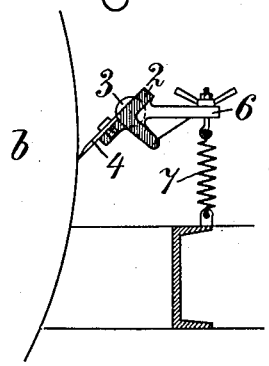

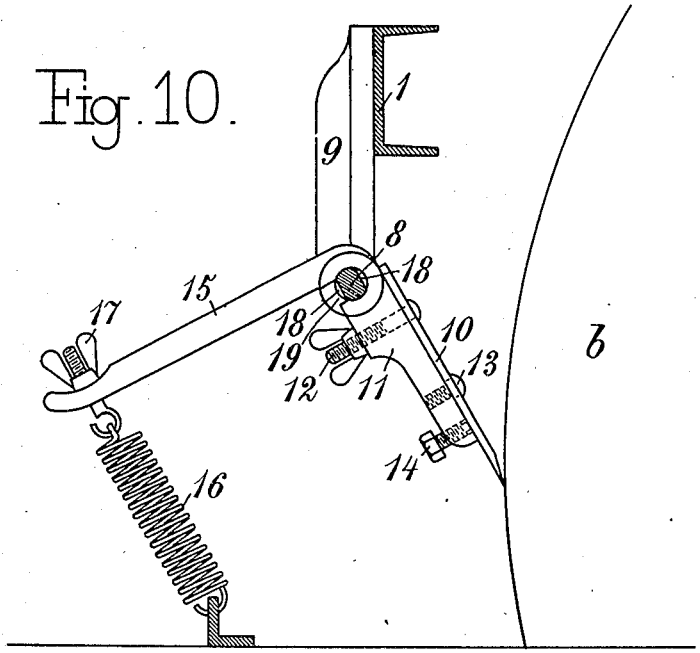
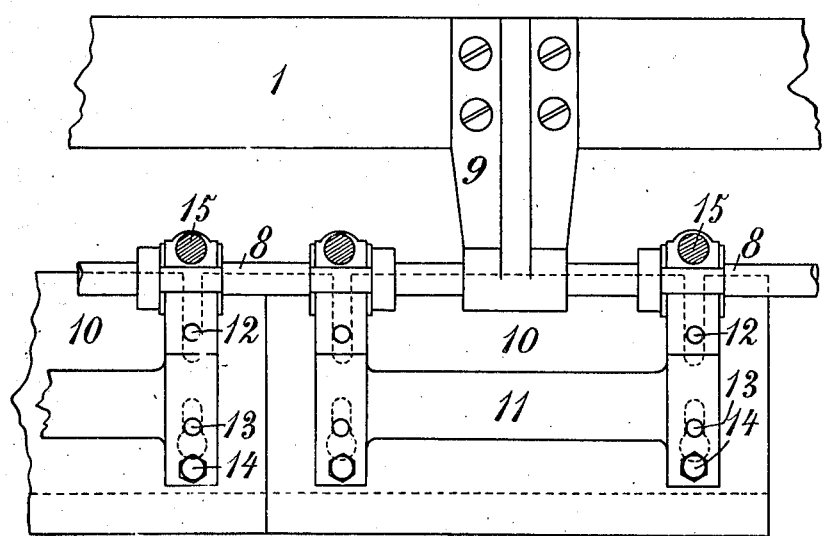

UNITED STATES PATENT OFFICE.

HANS HENRIK SCHOU, OF COPENHAGEN, DENMARK, AND EJNAR SCHOU, OF LONDON, ENGLAND.

PROCESS OF MANUFACTURING BUTTERIN.

No. 904,231. Specification of Letters Patent. Patented Nov. 17, 1908.

Application filed February 15, 1907. Serial No. 357,529.

*To all whom it may concern:*

Be it known that we, HANS HENRIK SCHOU and EJNAR SCHOU, subjects of the King of Denmark, residing, respectively, at Copenhagen, Denmark, and London, England, have invented certain new and useful Improvements in Processes of Manufacturing Butterin, of which the following is a full, clear, and exact description.

This invention relates to the manufacture of butterin, and similar products, in which various kinds of fatty substances are combined with milk and solidified to form compounds resembling butter.

In different countries the terms margarin, oleomargarin, butterin and so forth, have different significance as respects their composition, and we therefore emphasize the fact that our invention does not relate to compounds containing fatty matters exclusively, but only to compounds which contain fatty matters associated with liquids such as milk and cream, which compounds we identify herein as butterin. In the manufacture of substances of this character, the practice heretofore has been to mix with the fatty substances a certain quantity of liquid, mostly milk, the proportion of milk sometimes approximating 50%. This has been churned together to form an emulsion, immediately after which it has been subjected to a stream of cold water, the purpose of which is to congeal the emulsion into solid form, so as to entrap the liquid and prevent its separation from the fatty matters. After this, the mass is allowed to stand until fermentation of the milk has taken place to the desired extent, and then the mass worked up into final form.

In the cooling operation, by means of a stream of water, a considerable quantity of the milk is necessarily washed out and lost, and as the water cannot be given a temperature much below 36° F., it is not cold enough to quickly congeal the emulsion throughout, but merely results in forming a congealed film or skin partially over and around the various small bodies of the emulsion into which it is broken up by the impact of the water, leaving the interior portions of such bodies softer, and the liquid therein more or less free to escape. When these partially congealed bodies are worked up into final form, the mass is of uneven texture, and the finished product is less valuable than it otherwise might be.

The object of our invention is to accomplish the cooling of the emulsion in such a way as to avoid the loss of any of the liquid or milk which it contains and to produce a congealed mass of uniform hardness throughout, so that its texture will be even, and the finished product have a fine smooth grain and be of good flavor.

Our invention therefore consists in reducing the emulsion to the form of a thin layer and immediately subjecting the layer to such a low temperature, that it will very quickly become congealed throughout its thickness, and thus at once entrap and retain the entire quantity of milk or other liquid that may be contained in the emulsion. In this way it will be seen that none of the milk is washed out or lost, and the texture is necessarily uniform, because the congealing or crystallization is uniform throughout the entire thickness of the layer. In this connection, it may be pointed out, that one of the best methods of applying the low temperature to the layer, is to spread the layer upon a metallic surface, such as the surface of a cylinder or drum, which is kept very cold by the circulation of brine or other refrigerating material, and as only one surface of the layer would thus come in contact with the cooling surface, it is essential to form the layer very thin, and in fact in our practice of the invention, the layer is not more than 1½ mm. thick, and may be as thin as ¾ of a mm. It will be understood that this extraordinary thinness of the layer of emulsion, makes it possible to practically instantaneously congeal it throughout, especially when a temperature below freezing point is applied to it, and we may add that the cooling temperature and the thickness of the layer of emulsion should bear such relation to each other that this quick congealing throughout will occur. For instance, with extremely low temperatures a thicker layer of emulsion can be more successfully treated than with higher temperatures.

Accompanying this specification, are drawings illustrating a machine for forming the emulsion into a thin layer, applying the low temperature thereto, and then removing the layer. Any other form of machine or any other process might be used which would afford the required result, to wit, the quick cooling or congealing of the emulsion or mass throughout its entire body, but the machine herein illustrated is one example of a satisfactory means for obtaining the said result.

Figure 1, is a side elevation partly broken away of an apparatus for carrying out the invention; Fig. 2, is an end view of the same; Fig. 3, is a top plan view partly in section; Fig. 4, is a detail side view of one of the parts; Fig. 5, is a view from the left in Fig. 4; Fig. 6, is a top view of the same; Figs. 7, 8 and 9 are respectively front, end and sectional views of certain scraper mechanism which we employ; Figs. 10 and 11, show an alternative construction of the scraper mechanism, but which is the same as that used in Fig. 1.

Referring to the drawings in which like parts are designated by the same reference sign, $b$, $b$, indicate a pair of cylindrical drums, journaled to revolve toward one another on horizontal axes. These drums are conveniently mounted on the hollow shafts $c$ which revolve in the bearings $d$, fixed to the supporting beams $a$.

$h$ indicates worm gears on the shafts $c$, which respectively mesh with the worms $f$ on a shaft $g$, carrying the tight and the loose pulleys $k$, $m$. The pitch directions of the worms $f$, $f$, are opposite to one another, so that the drums $b$ are rotated toward one another in the direction of the arrows.

The drums $b$ are hollow, and each has an interior cylinder or body $n$, which occupies the center of the chamber, so that only a comparatively narrow annular passage $o$ is produced along the inside surface of the respective drums. The shaft $c$ of each drum has a central partition $c'$ and pipe connections $c^2$ at each end which lead into the shaft through stuffing boxes $p$.

$c^4$ indicates pipes projecting from the shaft $c$ so as to lead fluid therefrom to points closely adjacent to the surface of the drum.

Coöperating with the two drums is a device for deflecting the fluid composition properly on to their surfaces. It will be observed that each drum has an end face $r$, which is carefully machined into a plane normal to the axis of the drum, the planes of these faces at the corresponding ends of the two drums being in exactly the same plane.

$s$ indicates a pair of standards upon the beams $a$, and which project upward in a plane between the two drums, as clearly shown in Figs. 1 and 3. Each of these standards has a vertical groove $t$ therein, which receives a channel iron $u$, capable of vertical movement.

$y$ indicates screws in the standards which support the channel irons $u$ in a lateral direction. Each of the channel irons $u$ carries a plurality of blade springs $v$, which are attached at their extremities to a thin plate $x$ in any suitable way. Each of the plates $x$ is formed to fit between the drums $a$ and $b$, at their ends, and to contact with the faces $r$ thereof. The springs $v$ serve to keep the plates in intimate contact with the surfaces $r$, and the tension is adjustable by the screws $y$. The plates are pressed downwardly by the friction of the drums in their rotation.

Coöperating with each drum is a scraper blade or blades, supported to remove the film or coating from their surfaces. A convenient arrangement is the one shown in Figs. 1, 10 and 11, in which a channel iron 1 is supported transversely between the beams $a$, by means of standards $z$ therefrom.

8 denotes a transverse rod or shaft, supported from the channel iron 1, by hangers 9, at spaced intervals thereon. In this way the rod or shaft is very rigidly held. Between each of the hangers 9 there are supported scraper frames 11, which are loosely mounted on the shaft 8.

10 denotes scraper blades upon the scraper frames 11, adjustably held thereto by the screws 12 and 13.

14 denotes set screws, by which the edge of the blades is adjusted relatively to the scraper frames. Each of the scraper frames 11 has an arm 15, which is impelled by a spring 16, adjustable by the thumb nut 17. In this way the scraper frames and blades are impelled against the drums $b$. A feature of this construction consists in having the rod or shaft 8 with flattened faces 18, and the scraper frames 11 with cut-away parts 19, so that the scraper frames may be moved into a position to slip over the flattened parts of the rod 8, and be removable.

An alternative construction of scraper blades is illustrated in Figs. 7, 8 and 9. The construction already described is very rigid in use, but in some cases sufficient rigidity can be obtained by a single scraper blade extending transversely across the entire width of each of the drums $b$. For this purpose scraper frames 2 are formed at their ends with projecting trunnions 3, which are directly received in bearings in the standards $s$.

5 denotes removable journal boxes, by which the scrapers are removable. The scraper blades 4 are fastened to the scraper frames 2 in any suitable way.

6 denotes arms projecting from the scraper frames 2 and which are engaged by the tensile springs 7, so as to impel the scraper blades against the respective drums.

The operation is as follows: Cooled brine is directed through the hollow shafts of the rollers and these are brought into rotation. The emulsion flowing from the churns is now permitted to pass to the space formed between the drums and the two plates $x$ fixed against the ends of the drums. A layer of emulsion will then be situated between the drums and the thickness of this layer is determined by the distance of separation of the drums at the place where their surfaces are nearest each other, and this layer is equally divided between the two surfaces. When these, owing to the rotation of the drums, move away from each other, they carry a thin film or coating on their surfaces, and these thin coatings are cooled and crystallized very quickly owing to the cooled brine flowing through the drums. When the coatings reach the knives, they are scraped off and fall therefrom in the form of thin shavings.

The described apparatus for carrying out the method is, as already stated, to be considered an example only, and certain features may be changed without altering the nature of the invention. Characteristic of the action of the machine is, that the emulsion is made to spread itself between two surfaces which move away from each other after having passed a place where they are at a certain small distance apart, whereby the layer of butterin situated at this place between the surfaces, is divided into two layers, each of which remains on its own surface, the thickness of the layer being determined by the distance between the surfaces at the place where they commence to move away from each other.

The emulsion is made to crystallize or congeal by being cooled while it is spread out in these thin layers, and as far as the principle is concerned, it is of no consequence, whether the cooling takes place on the surfaces themselves or in any other manner. It is obvious, that compared to the old method a great number of advantages and lower costs are obtained by employing the new method, aside from the fact, that the product has proved to be better with respect to consistency and flavor. The fact is that no milk is removed by cooling water, as such is not used; the whole quantity of milk introduced into the churns may, consequently, exercise its useful effect during fermentation, which, moreover, is effected with more intensity owing to the emulsion not being washed out. As no milk is washed away a less quantity of it may be used whereby considerable saving is effected. Finally, a product of a better consistency is obtained, the crystals showing finer grains by this method, than by using water. A considerable advantage is, of course, the saving of cooling power, the new method not requiring more of this, than what is required for effecting crystallization, while in using cooling water a considerable amount of cold is carried off with it. By this arrangement the necessity for a supply of cooling water is avoided, and the necessity of providing drainage therefor, which in some cases is a matter of great practical importance is also avoided.

A feature of the apparatus lies in the arrangement by which the drums $b$ are partially filled by the shell or member $n$, so that only a comparatively thin narrow annular passage is provided through which the cooling fluid circulates. By partly filling out the drums in this manner, the advantage is obtained that only a small quantity of brine or cooling medium is present therein. In this way the drums become lighter, the temperature is easier to control, and there is less brine to cool when the apparatus is to be used after standing idle for a length of time, so as to become warmed to the temperature of the surrounding air. If at any time it is desired to remove the brine from the drums, this may be accomplished by means of the draining devices $q$.

What we claim, is:

1. In the manufacture of butterin and similar substances, the process consisting in churning fatty matters and liquids such as milk into an emulsion, then reducing the emulsion to a definite thin form and applying a cooling temperature thereto of such degree as to instantaneously congeal or crystallize the material throughout.

2. In the manufacture of butterin and similar substances, the process consisting in churning fatty matters and liquids such as milk into an emulsion, then reducing the emulsion to a definite thin layer form and subjecting the layer to a cooling temperature proportional to the thickness of the layer to instantaneously congeal or crystallize the layer throughout its thickness.

In witness whereof, we subscribe our signatures, in the presence of two witnesses.

HANS HENRIK SCHOU.
EJNAR SCHOU.

Witnesses:
VIGGO BLOM,
CECIL VILHELM SCHOU.